United States Patent [19]

Talbert

[11] 4,102,621

[45] Jul. 25, 1978

[54] APPARATUS FOR PRODUCING POLYURETHANE FOAM BUNS OF VARYING HEIGHTS

[75] Inventor: Miles E. Talbert, High Point, N.C.

[73] Assignee: Thomasville Products, Inc., High Point, N.C.

[21] Appl. No.: 730,800

[22] Filed: Oct. 8, 1976

[51] Int. Cl.² .............................................. B29D 27/04
[52] U.S. Cl. ..................................... 425/224; 264/51; 425/470; 425/817 C
[58] Field of Search ................... 264/51; 425/4 C, 89, 425/224, 329, 817 C, 470, 115, 375

[56] References Cited

U.S. PATENT DOCUMENTS

| | | | |
|---|---|---|---|
| 3,832,099 | 8/1974 | Berg | 425/817 C X |
| 3,870,441 | 3/1975 | Petzetakis | 425/817 C X |
| 4,005,958 | 2/1977 | Porter | 425/817 C X |
| 4,060,579 | 11/1977 | Schmitzer et al. | 425/4 C X |

*Primary Examiner*—Francis S. Husar
*Assistant Examiner*—Mark Rosenbaum

[57] ABSTRACT

Liquid foam reactants are deposited on an inclined pour plate from whence the reactants flow by gravity onto a single carrier, open top conveyor which carries the resulting foam bun away from the pour plate as it expands. A connecting wall is hingedly attached to the inclined pour plate along the lower edge thereof, which is also the "creamline." An elevator is attached to the pour plate, which, although generally maintained at a constant inclination during operation, may be selectively raised or lowered during operation to substantially alter the bun height adjusting the creamline height relative to the conveyor bed. The lower edge of the connecting wall loosely rests on the conveyor and moves back and forth responsive to adjustment of the creamline height, thereby maintaining support beneath the foaming bun between the pour plate and connector bed.

1 Claim, 1 Drawing Figure

APPARATUS FOR PRODUCING POLYURETHANE FOAM BUNS OF VARYING HEIGHTS

BACKGROUND OF THE INVENTION

This invention relates to the continuous production of a polymeric expandable foam bun through an open top conveying apparatus which allows the foam to rise freely due to chemcial reaction until full height is obtained. The bun is then cured and subsequently is subjected to a transverse sawing operation to saw the continuous bun into relatively long (25–200 feet) lengths which can be more easily handled and processed. The typical foam bun will have a cross-sectional width of approximately 81 inches and a height that varies from 25–40 inches.

After the bun is cross-sawed into even shorter lengths, it is then subjected to a further sawing operation, along a horizontal plane transverse to the height dimension, in which the foam is cut into slabs of the proper thickness for mattresses and cushions. Since different manufacturers require different thicknesses, it is desirable to vary the bun height somewhat, so that the total height will equal, as nearly as possible, an even multiple of the individual slab thickness to minimize waste.

A problem exists in varying overall bun height, to any appreciable extent, at a given pouring rate. Previous methods that have been attempted include the device shown in the Ferstenberg U.S. Pat. No. 3,672,348, which is illustrative of a device which controls the upper contour of the foamed bun (bun height) by varying the lateral pressure and the inclination of the conveyor type molding apparatus onto which the reactants are initially poured. Such an apparatus, while technically feasible, is both expensive to build; difficult to maintain in satisfactory operation condition because of the many parts which move relative to each other; and not easily altered to change the bun height. Further, according to the Ferstenberg disclosure, when the bun height is changed, the width is also changed, which is not satisfactory for the production of foam buns having a constant width, and variable height.

Some alteration in bun height can be made by varying the conveyor speed, which is generally easily changed, however, only minor variations can be made without deleteriously affecting the quality of the foam bun output. If the conveyor is too slow, the foam material backs up at the outset in front of the creamline, which is called "undercutting," and results in a bad quality foam. On the other hand, if the conveyor speed is too fast, the cell structure of the foam will become non-uniform, which is also undesirable. Therefore, with a constant pour rate, pour angle, and creamline height, the conveyor speed must remain fairly constant and cannot be significantly varied to achieve desired variances in bun height.

Another possibility might be to vary the conveyor speed and the pour rate, which one might think would overcome the problems set forth in the paragraph above. However, changing the pour rate can also directly cause considerable difficulty and lead indirectly to other problems. When the pour rate is changed, absent other adjustments which may be difficult or practically impossible with such types of conveyors, the creamline will tend to vary longitudinally with respect to the conveyor bed, thus varying the point at which the bun attains full height. It is apparent that this is not satisfactory.

From the above discussion it is easily seen that the problem is more difficult than may at first appear, and it is desirable to arrive at some solution where the bun height may be selectively varied through a significant range with a minimum of adjustments necessary to the system as a whole.

SUMMARY OF THE INVENTION

The present invention, therefore, is directed to an apparatus and technique for facilitating substantial alterations in the bun height of an expanded foam product, while maintaining a prescribed constant pouring rate. In general, the adjustment is made by varying the creamline height relative to the conveyor bed, without longitudinal movement or variation in the inclination of the pour plate, while adjusting the conveyor speed accordingly.

As far as the structure for the present invention is concerned, the pour plate is formed as an articulated or segmented member having an upper section and a lower connecting wall or section. The connecting wall is hinged to the pour plate with the lower edge thereof resting loosely on, but unattached to the surface of the front end of the conveyor. An elevator means is attached to the upper section or pour plate for raising or lowering the upper section, onto which the liquid foam reactant is poured, without varying the inclination thereof. The result is that the creamline, which may be set and maintained at the transverse dividing line between the pour plate and connecting wall, is raised or lowered in a vertical path depending on the desired bun height to be achieved.

As the creamline height is raised relative to the conveyor bed, the conveyor is slowed down accordingly, and the height of the bun is therefore increased. Conversely, when the creamline is lowered, the conveyor speed is increased, and therefore the bun height is decreased. No other adjustments are necessary. During raising and lowering of the creamline, the inclination of the connecting wall is varied responsive thereto, and the lower edge thereof actually moves longitudinally back and forth along the conveyor to maintain continuous support beneath the bun as it begins to foam.

It is therefore an object of the present invention to provide an apparatus and method whereby the bun height of a continuously foamed polymeric bun may be selectively and significantly varied.

It is another object of the present invention to provide an apparatus and method whereby the bun height of the continuously foamed, polymeric bun may be altered with a minimum of equipment adjustment.

It is further an object of the present invention to provide an apparatus of the type described in which bun height is varied merely by adjusting the height of the pour plate above the conveyor bed and by variance of the conveyor speed.

Other objects and a fuller understanding of the invention will become apparent from a reading of the following detailed disclosure of a preferred embodiment, along with the accompanying drawing in which:

The sole FIGURE is a longitudinal sectional view, generally schematic in nature, of the apparatus according to the present invention.

DETAILED DESCRIPTION OF THE PREFERRED EMBODIMENT

Figure 1:
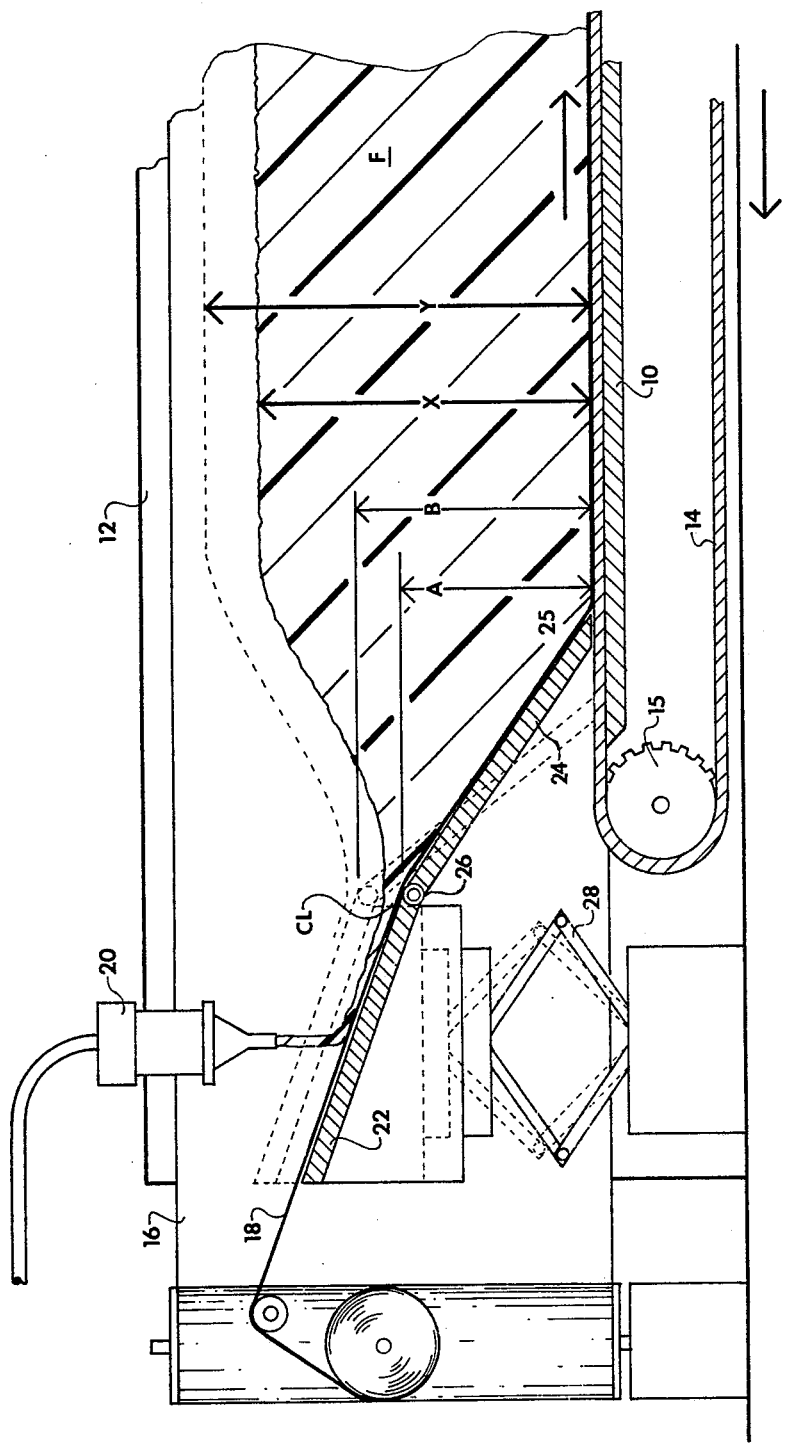

Turning now to a discussion of a preferred embodiment of the apparatus according to the present invention, there is illustrated an open top, continuously-moving, conveyor type molding machine of the type generally in use for producing polymeric foam material. The liquid foam reactants are a blend of substances known to those familar with the art. As the materials are brought together, a chemical reaction accurs which cause the mixture first to form a rising foam, then to solidify. Such machines include a floor or bottom wall 10 and a pair of spaced upstanding side walls 12 through which the solidifying materials advance.

A conveyor 14 is so arranged that the upper flight lies on the bottom wall 10 and continuously moves therealong at a prescribed, present speed, which may be selectively varied. If desired, and most machines provide for such, side conveyors (not shown) are similarly arranged with respect to the side walls 12 for applying a moving force along the side walls of the bun F which is subsequently formed. This prevents drag or distortion to the side areas. Polyethylene, paper or other types of polymeric film 16, 18 extend along and move continuously with the conveyors to provide a separating film between the foam material F and the side walls or conveyor surfaces to prevent sticking of the material thereto.

One or more nozzles 20 are positioned above a pour plate 22 and so arranged in pattern extending transversely across the width thereof, usually reciprocating, to apply a thin film of liquid foam reactant onto the pour plate. The inclination of the pour plate 22 is generally set with respect to the pour rate from nozzles 20, and the nozzles so arranged longitudinally that the creamline CL occurs at the lower edge of the pour plate 22. At this point, a connecting wall 24 is hingedly attached to pour plate 22 by means of some suitable type of hinge system 26. This lower plate section or connecting wall 24 is otherwise unattached, so that it dangles or falls loosely and unattached against the upper surface of conveyor 14 at its lower terminal edge 25.

An elevator means 28, which can be any suitable type of commercially available lifting mechanism, such as a jack, scissors lift, or the like, is attached in supporting relationship to the undersurface of pour plate 22 so that said upper section or the pour plate may be raised or lowered, as desired, with respect to the bed of conveyor 25. It should be noted, however, that such adjustment does not necessitate any longitudinal movement, since the pour plate 22 and conveyor 25 are unattached.

So arranged, the liquid foam reactants are deposited onto the pour plate 22 from whence they flow by gravity to the lower edge thereof, or to the creamline CL. At this point foaming begins and the bun commences to rise to a height X which is determined with a given pour rate by the distance A of the creamline above the conveyor bed in conjunction with the speed of the conveyor 14.

In operation, where it is desired to raise the bun height to a higher elevation Y, the elevator means 28 is activated to lift the upper section 22 of the pour plate while maintaining the inclination, so that the creamline CL is elevated to a second height B above the conveyor bed. Simultaneously, the conveyor speed is slowed accordingly, so that the same density or uniformity of cell structure is maintained. The bun will then rise to the desired height Y. To lower the bun height, the reverse procedure is instituted.

It is thus seen that the simple technique of adjusting the creamline height and conveyor speed will alter the bun height significantly, while the very critical relationships of pour rate and pour and rise angle remain constant. Further, the alterations can be made with a minimum of equipment readjustment. In fact, the technique is so simple that the adjustment can be made without stopping the pouring of the liquid foam reactants at all.

It is apparent that various changes and modifications might be made to the invention, as far as the means for lifting the pour plate is concerned, without departing from the scope of the invention which is to be determined from the following claims.

What is claimed is:

1. In foaming machines of the type where liquid foam reactants are poured onto a pour plate from above from whence they flow by gravity to a point where a creamline is formed and thence into an open top, closed side and bottom, channel-shaped conveyor, which carries the mixture away from the pour plate as it expands and cures into a bun, the improvement wherein said pour plate comprises
    (a) an upper, planar inclined section onto which said liquid reactants are poured from nozzles above;
    (b) a lower connecting wall having a planar surface and hingedly attached along the upper edge thereof to the lower edge of said upper section, said connecting wall having a lower edge lying supported on, but unattached to said conveyor;
    (c) elevating means engagable with said upper section only for raising and lowering said upper section without changing the angle of inclination thereof;
    (d) so that the bun height is altered responsive only to the activation of said elevating means without any change of inclination of the pour plate.--

* * * * *